(12) United States Patent
Traini, Jr.

(10) Patent No.: US 12,555,606 B2
(45) Date of Patent: Feb. 17, 2026

(54) VIDEO RECORDING SYSTEM FOR SYNCHRONIZING A PLURALITY OF AUDIO INPUTS

(71) Applicant: Vespucci B. Traini, Jr., New Kensington, PA (US)

(72) Inventor: Vespucci B. Traini, Jr., New Kensington, PA (US)

( * ) Notice: Subject to any disclaimer, the term of this patent is extended or adjusted under 35 U.S.C. 154(b) by 0 days.

(21) Appl. No.: 18/674,255

(22) Filed: May 24, 2024

(65) Prior Publication Data

US 2025/0364011 A1 Nov. 27, 2025

(51) Int. Cl.
*G11B 20/10* (2006.01)
*H04N 9/802* (2006.01)

(52) U.S. Cl.
CPC ....... *G11B 20/10527* (2013.01); *H04N 9/802* (2013.01); *G11B 2020/10592* (2013.01); *G11B 2020/1062* (2013.01)

(58) Field of Classification Search
CPC .... G11B 20/10527; G11B 2020/10592; G11B 2020/1062; H04N 9/802
USPC .......................................................... 386/241
See application file for complete search history.

(56) References Cited

U.S. PATENT DOCUMENTS

| | | |
|---|---|---|
| 5,361,378 A | 11/1994 | Traini, Jr. |
| 5,815,588 A | 9/1998 | Traini, Jr. |
| 6,072,933 A | 6/2000 | Green |
| RE40,688 E | 3/2009 | Green |
| 8,160,421 B2 | 4/2012 | Lindroos et al. |
| 8,179,475 B2 | 5/2012 | Sandrew |
| 9,466,221 B2 | 10/2016 | Jackson |
| 9,691,429 B2 | 6/2017 | Leiberman et al. |
| 10,332,560 B2 | 6/2019 | Sandberg et al. |
| 10,536,664 B2 | 1/2020 | Lindroos et al. |
| 10,789,920 B1 | 9/2020 | Dolder et al. |

(Continued)

FOREIGN PATENT DOCUMENTS

| | | |
|---|---|---|
| WO | 0197045 A1 | 12/2001 |
| WO | 2021101786 A1 | 5/2021 |
| WO | 2022016147 A1 | 1/2022 |

OTHER PUBLICATIONS

"Add audio to your post on Instagram", Instagram Help Center.

(Continued)

*Primary Examiner* — Thai Q Tran
*Assistant Examiner* — Nienru Yang
(74) *Attorney, Agent, or Firm* — The Webb Law Firm

(57) ABSTRACT

Methods, systems, and computer program products for synchronizing a plurality of audio inputs may include receiving data inputs including a first data input, a second data input, and a third data input, from one or more data source, providing, as inputs to a media management system, the first data input, the second data input, the third data input, and data associated with a synchronization function with regard to synchronization of the data inputs for use by the media management system to generate an output, and executing a synchronization procedure on the first data input, the second data input, and the third data input to generate the output of the media management system, the output of the synchronization procedure of the media management system including a synchronized audio-video file combining the first data input, the second data input, and the third data input.

7 Claims, 4 Drawing Sheets

(56) References Cited

U.S. PATENT DOCUMENTS

| | | | |
|---|---|---|---|
| 2007/0036523 A1 | 2/2007 | Traini, Jr. | |
| 2007/0044137 A1 | 2/2007 | Bennett | |
| 2009/0273712 A1 | 11/2009 | Landy | |
| 2011/0115878 A1 | 5/2011 | Noteware et al. | |
| 2014/0328574 A1 | 11/2014 | Sandberg et al. | |
| 2018/0350405 A1* | 12/2018 | Marco | G11B 27/031 |
| 2019/0297299 A1* | 9/2019 | Lindroos | H04N 21/439 |

OTHER PUBLICATIONS

"Add songs from TikTok", TikTok Help Center.
"Duets", TikTok Help Center.
"How do I add music to my Snap?", Snapchat Support.
"Snap Sounds & Music; Add Sounds to make your Snaps more memorable", Snapchat.
"Sounds", TikTok Help Center.
"Stitch", TikTok Help Center.
"5 Best Apps to Add Music to Video on iPhone & Android (2023)", Cyberlink (Mar. 8, 2024).

* cited by examiner

VIDEO RECORDING SYSTEM FOR SYNCHRONIZING A PLURALITY OF AUDIO INPUTS

BACKGROUND

Field of the Disclosure

The present disclosure relates to a video recording system, and in particular, to methods, systems, and computer program products for synchronizing a plurality of audio inputs with a video input during recording of the video input and one or more of the audio inputs.

Description of Related Art

Computers or computing devices, including mobile computing devices such as laptops, tablets, smart phones, and the like include various resources, systems, and components for recording media such as video (i.e., moving images) and audio (i.e., sound). These resources include processors, memory, storage, and other devices such as microphones, cameras, and other sensors. Computer program products for use with such computers may allow for recording of video and/or audio on electronic media, such as by capturing the moving images and/or sound via a camera and/or microphone. Such products record video and/or audio by electronically or digitally recording or inscribing and recreating the moving images or sound as waves, signals, or the like to an electronic or computer readable medium, such as a file, which is then stored to a memory or storage device.

Computer program products may further allow components or aspects of the relevant electronic or computer readable media to be adjusted. For example, volume of audio or of certain audio signals may be adjusted, play-back rates may be adjusted, multiple audio/and or audio signals may be mixed, or certain aspects of audio or video may be added or removed. Additionally, in live broadcasting applications, computer program products may allow for the recordation of audio and video, while allowing overlay of another video or audio medium to the audio and/or video being recorded.

However, challenges exist when trying to synchronize a plurality of electronic or computer readable media, such as one or more video medium and one or more audio medium, simultaneously or in real-time (i.e. at a time at which or close to a time at which operations of a system are carried out) as at least one of the video medium and/or audio medium are being recorded. For example, in live broadcasting applications, overlaying additional sound or moving images to live video streams or recordings does not happen in real-time, instead, there is a delay that accounts for the time it takes to overlay the additional media to the stream or recording and/or manually adjust certain aspects for synchronization. This involves a complicated synchronization and editing process for the user. Further, challenges exist to ensure that the resulting video plus audio stream or recorded media flows together and meets certain visual and audial criteria.

SUMMARY

Accordingly, provided are methods, systems, and computer program products for synchronizing a plurality of audio inputs with a video input during recording of the video input and one or more of the audio inputs.

According to non-limiting embodiments or aspects of the disclosure, a method for synchronizing a plurality of audio inputs with a video input includes receiving, with at least one processor, data inputs including a first data input, a second data input, and a third data input from one or more data source; providing, with at least one processor and as inputs to a media management system, the first data input, the second data input, the third data input, and data associated with a synchronization function with regard to synchronization of the data inputs for use by the media management system to generate an output; and executing, with at least one processor, a synchronization procedure on the first data input, the second data input, and the third data input, to generate the output of the media management system, the output of the synchronization procedure of the media management system includes a synchronized audio-video file combining the first data input, the second data input, and the third data input.

According to other non-limiting embodiments or aspects of the disclosure, a system for synchronizing a plurality of audio inputs with a video input includes at least one processor configured to: receive a first data input, a second data input, and a third data input from one or more data source; provide, as inputs to a media management system, the first data input, the second data input, the third data input, and data associated with a synchronization function with regard to synchronization of the data inputs for use by the media management system to generate an output; and execute a synchronization procedure on the first data input, the second data input, and the third data input, to generate the output of the media management system, the output of the synchronization procedure of the media management system includes a synchronized audio-video file combining the first data input, the second data input, and the third data input.

According to other non-limiting embodiments or aspects of the disclosure, a computer product synchronizing a plurality of audio inputs with a video input includes at least one non-transitory computer-readable medium including one or more program instructions that, when executed by at least one processor, cause the at least one processor to: receive a first data input, a second data input, and a third data input from one or more data source; provide, as inputs to a media management system, the first data input, the second data input, the third data input, and data associated with a synchronization function with regard to synchronization of the data inputs for use by the media management system to generate an output; and execute a synchronization procedure on the first data input, the second data input, and the third data input to generate the output of the media management system, the output of the synchronization procedure of the media management system includes a synchronized audio-video file combining the first data input, the second data input, and the third data input.

Further non-limiting illustrative examples of embodiments of the present disclosure will now be set forth in the following numbered clauses.

Clause 1: A method comprising: receiving, with at least one processor, data inputs comprised of a first data input, a second data input, and a third data input from one or more data source; providing, with at least one processor and as inputs to a media management system, the first data input, the second data input, the third data input, and data associated with a synchronization function with regard to synchronization of the data inputs for use by the media management system to generate an output; and executing, with at least one processor, a synchronization procedure on the first data input, the second data input, and the third data input, to generate the output of the media management system, the output of the synchronization procedure of the media management system comprises a synchronized audio-video file combining the first data input, the second data input, and the third data input.

Clause 2: The method of clause 1, wherein the first data input comprises a video input and the second data input comprises a first audio input, wherein the first audio input corresponds to the video input such that the first audio input is an audial component of the video input, and wherein the video input and the first audio input are received from an audio-video recording device.

Clause 3: The method of clause 1 or 2, wherein the video input is received in real-time and recorded as a video file, relative to capture of the video input by the audio-video recording device, wherein the first audio input is received in real-time and recorded as an audio file, relative to capture of the first audio input by the audio-video recording device, and wherein the video input and the first audio input are recorded together in real-time as an audio-video file, as audio and video are captured by the audio-video recording device.

Clause 4: The method of any of clauses 1-3, wherein the third data input is a second audio input associated with a pre-recorded audio file, and wherein the second audio input is received from a data source of the one or more data source via a communication network and recorded as part of the audio-video file in real-time, as the video input and the first audio input are received.

Clause 5: The method of any of clauses 1-4, wherein the pre-recorded audio file is not captured by the audio-video recording device.

Clause 6: The method of any of clauses 1-5, wherein executing the synchronization procedure on the first data input, the second data input, and the third data input comprises: manipulating, during synchronization of the data inputs by the media management system, at least one of the following: a relative volume level of the data inputs with respect to each other; a relative play-back speed of the data inputs with respect to each other; a timing interval associated with an event of any of the data inputs with respect to a timing interval associated with an event of any of the other data inputs; or any combination thereof, wherein, the manipulation is based on the data associated with the synchronization function with regard to synchronization of the data inputs for use by the media management system, and wherein at least one aspect of the manipulation is manually executed by a user during synchronization.

Clause 7: The method of any of clauses 1-6, further comprising: storing the audio-video file to a memory for play-back and distribution.

Clause 8: The method of any of clauses 1-7, further comprising: selecting the second audio input prior to capture of the video input and the first audio input by the audio-video recording device; operating, by the user, the audio-video recording device to capture the video input and the first audio input by the audio-video recording device; simultaneous with operating the audio-video recording device, inputting the second audio input to the media management system, the synchronization procedure executed during the operating the audio-video recording device.

Clause 9: The method of any of clauses 1-8, further comprising: during operation of the audio-video recording device, playing a portion of the second audio input that will synchronized with the video input and the first audio input in the audio-video file in an earpiece worn by the user, the manipulation performed by the user in response to playing the portion of the second audio input in the earpiece worn by the user.

Clause 10: A system, comprising: at least one processor configured to: receive a first data input, a second data input, and a third data input from one or more data source; provide, as inputs to a media management system, the first data input, the second data input, the third data input, and data associated with a synchronization function with regard to synchronization of the data inputs for use by the media management system to generate an output; and execute a synchronization procedure on the first data input, the second data input, and the third data input, to generate the output of the media management system, the output of the synchronization procedure of the media management system comprises a synchronized audio-video file combining the first data input, the second data input, and the third data input.

Clause 11: The system of clause 10, wherein the first data input comprises a video input and the second data input comprises a first audio input, wherein the first audio input corresponds to the video input such that the first audio input is an audial component of the video input, and wherein the video input and the first audio input are received from an audio-video recording device.

Clause 12: The system of clause 10 or 11, wherein the at least one processor is further configured to: receive the video input in real-time and record the video input as a video file, relative to capture of the video input by the audio-video recording device, receive the first audio input in real-time and record the first audio input as an audio file, relative to capture of the first audio input by the audio-video recording device, wherein the video input and the first audio input are recorded together in real-time as an audio-video file, as audio and video are captured by the audio-video recording device.

Clause 13: The system of any of clauses 10-12, wherein the third data input is a second audio input associated with a pre-recorded audio file, and wherein the at least one processor is further configured to receive the second audio input from a data source of the one or more data source via a communication network, and record the second audio input as part of the audio-video file in real-time, as the video input and the first audio input are received.

Clause 14: The system of any of clauses 10-13, wherein the pre-recorded audio file is not captured by the audio-video recording device.

Clause 15: The system of any of clauses 10-14, wherein, when executing the synchronization procedure on the first data input, the second data input, and the third data input, the at least one processor is further configured to: manipulate, during synchronization of the data inputs by the media management system, at least one of the following: a relative volume level of the data inputs with respect to each other; a relative play-back speed of the data inputs with respect to each other; a timing interval associated with an event of any of the data inputs with respect to a timing interval associated with an event of any of the other data inputs; or any combination thereof, wherein, the manipulation is based on the data associated with the synchronization function with regard to synchronization of the data inputs for use by the media management system, and wherein at least one aspect of the manipulation is manually executed by a user during synchronization.

Clause 16: The system of any of clauses 10-15, wherein the at least one processor is further configured to store the audio-video file to a memory for play-back and distribution.

Clause 17: The system of any of clauses 10-16, wherein: the second audio input is selected prior to capture of the video input and the first audio input by the audio-video recording device; the user operates the audio-video recording device to capture the video input and the first audio input by the audio-video recording device; and simultaneous with operating the audio-video recording device, the second audio input is input to the media management system, the synchronization procedure executed during the operating the audio-video recording device.

Clause 18: The system of any of clauses 10-17, wherein: during operation of the audio-video recording device, a portion of the second audio input that will synchronized with the video input and the first audio input in the audio-video file is played in an earpiece worn by the user, the user performs the manipulation in response to playing the portion of the second audio input in the earpiece worn by the user.

Clause 19: A computer program product, comprising at least one non-transitory computer-readable medium including one or more program instructions that, when executed by at least one processor, cause the at least one processor to: receive a first data input, a second data input, and a third data input from one or more data source; provide, as inputs to a media management system, the first data input, the second data input, the third data input, and data associated with a synchronization function with regard to synchronization of the data inputs for use by the media management system to generate an output; and execute a synchronization procedure on the first data input, the second data input, and the third data input to generate the output of the media management system, the output of the synchronization procedure of the media management system comprises a synchronized audio-video file combining the first data input, the second data input, and the third data input.

Clause 20: The computer program product of clause 19, wherein the first data input comprises a video input and the second data input comprises a first audio input, wherein the first audio input corresponds to the video input such that the first audio input is an audial component of the video input, and wherein the video input and the first audio input are received from an audio-video recording device.

Clause 21: The computer program product of clause 19 or 20, wherein the one or more program instructions further cause the at least one processor to: receive the video input in real-time and record the video input as a video file, relative to capture of the video input by the audio-video recording device, receive the first audio input in real-time and record the first audio input as an audio file, relative to capture of the first audio input by the audio-video recording device, and wherein the video input and the first audio input are recorded together in real-time as an audio-video file, as audio and video are captured by the audio-video recording device.

Clause 22: The computer program product of any of clauses 19-21, wherein the third data input is a second audio input associated with a pre-recorded audio file, and wherein the one or more program instructions further cause the at least one processor to receive the second audio input from a data source of the one or more data source via a communication network, and record the second audio input as part of the audio-video file in real-time, as the video input and the first audio input are received.

Clause 23: The computer program product of any of clauses 19-22, wherein the pre-recorded audio file is not captured by the audio-video recording device.

Clause 24: The computer program product of any of clauses 19-23, wherein the one or more program instructions that cause the at least one processor to execute the synchronization procedure on the first data input, the second data input, and the third data input, further cause the at least one processor to: manipulate, during synchronization of the data inputs by the media management system, at least one of the following: a relative volume level of the data inputs with respect to each other; a relative play-back speed of the data inputs with respect to each other; a timing interval associated with an event of any of the data inputs with respect to a timing interval associated with an event of any of the other data inputs; or any combination thereof, wherein, the manipulation is based on the data associated with the synchronization function with regard to synchronization of the data inputs for use by the media management system, and wherein at least one aspect of the manipulation is manually executed by a user during synchronization.

Clause 25: The computer program product of any of clauses 19-24, wherein the one or more program instructions that cause the at least one processor to execute the synchronization procedure on the first data input, the second data input, the third data input, and one or more additional data input, further cause the at least one processor to store the audio-video file to a memory for play-back and distribution.

Clause 26: The computer program product of any of clauses 19-25, wherein: the second audio input is selected prior to capture of the video input and the first audio input by the audio-video recording device; the user operates the audio-video recording device to capture the video input and the first audio input by the audio-video recording device; and simultaneous with operating the audio-video recording device, the second audio input is input to the media management system, the synchronization procedure executed during the operating the audio-video recording device.

Clause 27: The computer program product of any of clauses 19-26, wherein: during operation of the audio-video recording device, a portion of the second audio input that will synchronized with the video input and the first audio input in the audio-video file is played in an earpiece worn by the user, the user performs the manipulation in response to playing the portion of the second audio input in the earpiece worn by the user.

Further details and advantages of the various examples described in detail herein will become clear upon reviewing the following detailed description of the various examples in conjunction with the accompanying drawing figures.

BRIEF DESCRIPTION OF THE DRAWINGS

Additional advantages and details are explained in greater detail below with reference to the exemplary embodiments that are illustrated in the accompanying schematic figures, in which.

Corresponding reference characters indicate corresponding parts throughout the several views. The exemplifications set out herein illustrate exemplary embodiments of the disclosure, and such embodiment are not to be construed as limiting the scope of the disclosure in any manner.

DETAILED DESCRIPTION

Figure 1:
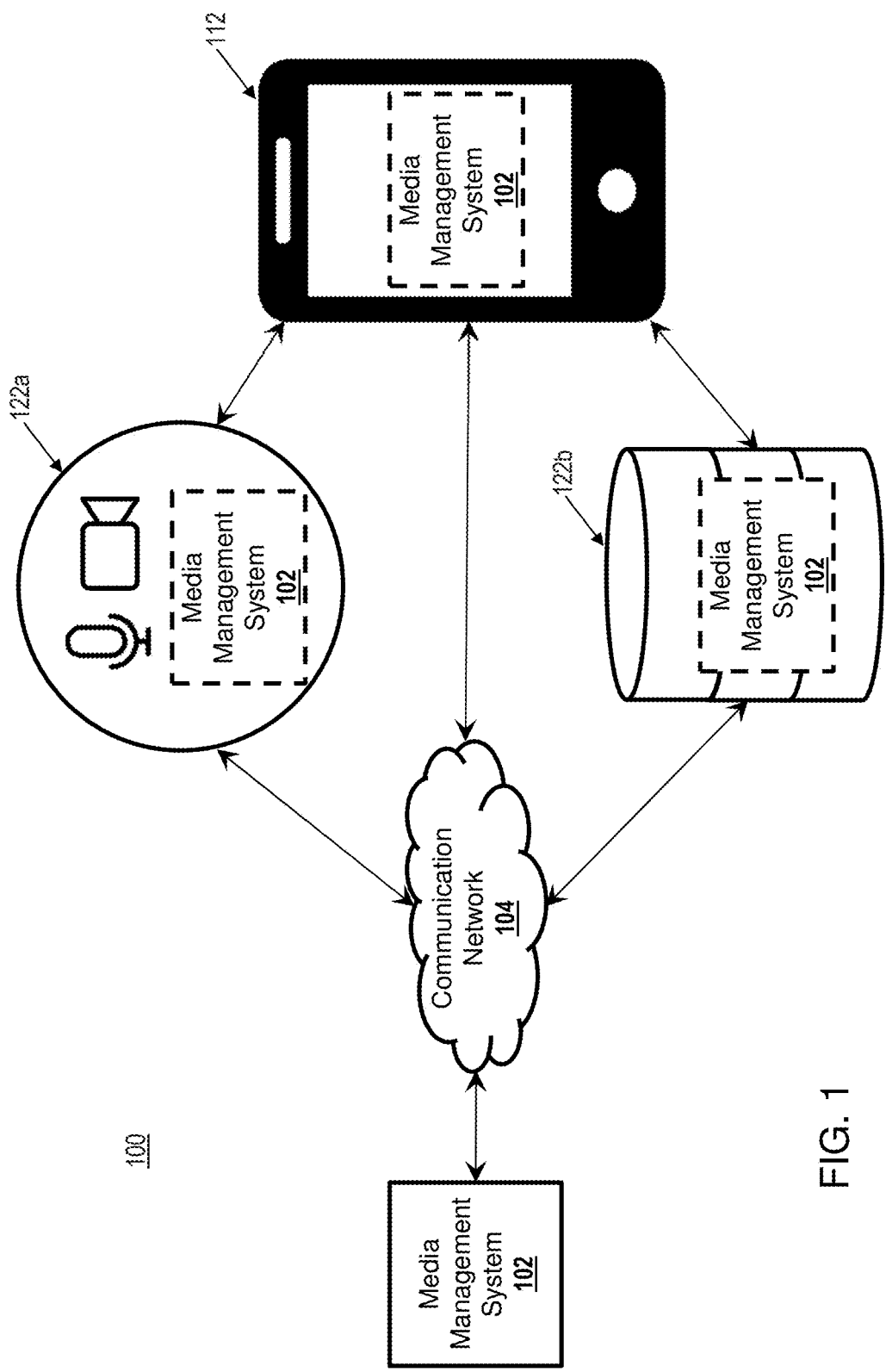
FIG. 1 is a schematic diagram of a system for synchronizing a plurality of audio inputs with a video input, according to some non-limiting embodiments or aspects of the present disclosure.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting.

Some non-limiting embodiments or aspects may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "video" may refer to moving images themselves in raw form whereas the term "video input" may refer to moving visual media or moving images in the form of electronic, digital, or other waves or signals. Similarly, as used herein, the term "audio" may refer to sound itself in raw form whereas the term "audio input" may refer to audial media or sound in the form of electronic, digital, or other waves or signals. Further, the term "file" may be used to refer to recorded electronic or computer readable media or to one or more collection of electronic or computer readable media.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second units. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. The computing device may include an audio-video recording device.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

Non-limiting embodiments or aspects of the present disclosure are generally directed to a video recording system, and in particular, to methods, systems, and computer program products for synchronizing a plurality of audio inputs with a video input during recording of the video input and one or more of the audio inputs. The disclosed subject matter provides for receiving data inputs which may include a first data input, a second data input, a third data input, and optionally one or more additional data input from one or more data source, providing, as inputs to a media management system, the first data input, the second data input, the third data input, optionally the one or more additional data input, and data associated with a synchronization function with regard to synchronization of the data inputs for use by the media management system to generate an output and executing a synchronization procedure on the first data input, the second data input, the third data input, and optionally one or more additional data input to generate the output of the media management system, where the output of the synchronization procedure of the media management system may comprise a synchronized audio-video file combining the first data input, the second data input, the third data input, and optionally one or more additional data input. In some non-limiting embodiments, the first data input may include a video input and the second data input may include a first audio input. The first audio input may correspond to the video input such that the first audio input is an audial component of the video input, and the video input and the first audio input are received from an audio-video recording device.

In some non-limiting embodiments, the video input may be received in real-time and recorded as a video file (real time relative to capture of the video input by the audio-video recording device), and the first audio input may be received in real-time and recorded as an audio file (real time relative to capture of the audio input by the audio-video recording device), and wherein the video input and the first audio input are recorded together in real-time as an audio-video file as audio and video are captured by the audio-video recording device.

In some non-limiting embodiments, the third data input may be a second audio input associated with a pre-recorded audio file, and the second audio input may be received from a data source of the one or more data source via a communication network and recorded as part of the audio-video file in real-time, as the video input and the first audio input are received. In some non-limiting embodiments, the pre-recorded audio file is not captured by the audio-video recording device. In some non-limiting embodiments, the one or more additional data input may include a third audio input associated with a pre-recorded audio file, and the third audio input may be received from a data source of the one or more data source via a communication network and recorded as part of the audio-video file in real-time, as the video input and the first audio input are received.

In some non-limiting embodiments, executing the synchronization procedure on the first data input, the second data input, the third data input, and optionally one or more additional data input may include manipulating, during synchronization of the data inputs by the media management system, at least one of the following: a relative volume level of the data inputs with respect to each other; a relative play-back speed of the data inputs with respect to each other; a timing interval associated with an event of any of the data inputs with respect to a timing interval associated with an event of any of the other data inputs; or any combination thereof. The manipulation may be based on the data associated with the synchronization function regarding synchronization of the data inputs for use by the media management system, and at least one aspect of the manipulation may be manually executed by a user via a user interface of a user device during synchronization. In some non-limiting embodiments, the audio-video file may be stored to a memory for play-back and distribution. The manipulation may be executed by a user interacting with a user interface of the audio-video recording device and/or buttons (e.g., volume control buttons) of the audio-video recording device. The manipulation may be executed by a user using a recording and/or mixing console during recording of the first audio/video input.

In some non-limiting embodiments, the second audio input may be selected prior to capture of the video input and the first audio input by the audio-video recording device; the audio-video recording device may be operated by the user to capture the video input and the first audio input by the audio-video recording device; and simultaneous with operating the audio-video recording device, the second audio input may be input to the media management system, the synchronization procedure executed during the operating the audio-video recording device.

In some non-limiting embodiments, during operation of the audio-video recording device, a portion of the second audio input that will synchronized with the video input and the first audio input in the audio-video file may be played in an earpiece worn by the user; and the manipulation may be performed by the user in response to playing the portion of the second audio input in the earpiece worn by the user. The earpiece may be a wired or wireless earpiece. For example, the earpiece may comprise a Bluetooth earpiece. Additionally or alternatively, the second audio input may be played from a speaker of the audio-video recording device, and the manipulation may be performed by the user in response to the user hearing the second audio input from the speaker.

In this way, embodiments of the present disclosure provide methods, systems, and computer program products for synchronizing a plurality of audio inputs with a video input during recording of the video input and one or more of the audio inputs such that a resulting audio-video media flows together and meets certain visual and audial criteria. Further, the audio-video file combining the plurality of inputs may be automatically generated in real-time relative to capture of the as the video input and the first audio input by the audio-video recording device without requiring the user to later perform a complicated compilation and/or editing process.

Referring now to FIG. 1, shown is example system 100 for synchronizing a plurality of audio inputs with a video input, according to some non-limiting embodiments or aspects of the present disclosure. For example, as shown in FIG. 1, system 100 may include media management system 102, communication network 104, user device 112, and/or one or more data source 122a, 122b.

Media management system 102 may include one or more devices capable of receiving information from and/or communicating information (e.g., directly via wired or wireless communication connection, indirectly via communication network 104, and/or the like) to user device 112, and/or one or more data source 122a, 122b. For example, media management system 102 may include a computing device, such as a server, a group of servers, a desktop computer, a portable computer, a mobile device, and/or other like devices. In some non-limiting embodiments or aspects, media management system 102 may be in communication with a data storage device (e.g., one or more data source 122a, 122b), which may be local or remote to media management system 102. In some non-limiting embodiments or aspects, media management system 102 may be capable of receiving information from, storing information in, communicating information to, or searching information stored in the data storage device (e.g., one or more data source 122a, 122b). In some non-limiting embodiments or aspects, media management system 102 may include a plurality of resources, such as a plurality of physical resources (e.g., bare metal servers) and/or a plurality of virtual resources (e.g., virtual machines that are run on hardware). In some non-limiting embodiments or aspects, media management system 102 may include a control device (e.g., a central controller, a primary server, a hypervisor, etc.) that operates to control the plurality of resources.

Communication network 104 may include one or more wired and/or wireless networks. For example, communication network 104 may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

User device 112 may include one or more devices capable of receiving information from and/or communicating information (e.g., directly via wired or wireless communication connection, indirectly via communication network 104, and/or the like) to media management system 102, and/or one or more data source 122a, 122b. For example, user device 112 may include a computing device, such as a mobile device, a portable computer, a desktop computer, and/or other like devices. User device 112 may be an audio-video recording device. User device 112 may comprise a component for capturing a video (e.g., a camera and/or video camera) and/or for generating a video file from the captured video. User device 112 may comprise a component for capturing audio (e.g., a microphone) and/or for generating an audio file from the captured audio. The video and audio captured by user device 112 may be of sounds and images in surroundings of user device 112. User device 112 may include a database configured to store an audio file, a video file, and/or an audio-video file captured by and/or generated by user device 112.

Additionally or alternatively, each user device 112 may include a device capable of receiving information from and/or communicating information to other user devices (e.g., directly via wired or wireless communication connection, indirectly via communication network 104, and/or the like). In some non-limiting embodiments or aspects, user device 112 may be part of media management system 102 and/or part of the same system as media management system 102. For example, media management system 102, one or more data source 122a, 122b, and user device 112 may all be (and/or be part of) a single system and/or a single computing device.

One or more data storage device 122a, 122b may include one or more devices capable of receiving information from and/or communicating information (e.g., directly via wired or wireless communication connection, indirectly via communication network 104, and/or the like) to media management system 102, user device 112, and/or another one or more data source 122a, 122b. For example, one or more data source 122a, 122b may include a computing device, such as a server, a group of servers, a desktop computer, a portable computer, a mobile device, and/or other like devices. In some non-limiting embodiments, data source 122a, 122b may include one or more devices capable of recording, copying, inscribing and/or transcribing data. For example, one or more data source 122a, 122b may include a digital camera, an analog camera, a digital microphone, an analog microphone, and/or other like devices. In some non-limiting embodiments or aspects, one or more data source 122a, 122b may include a data storage device. In some non-limiting embodiments or aspects, one or more data source 122a, 122b may be capable of receiving information from, storing information in, communicating information to, or searching information stored in the data storage device. In some non-limiting embodiments or aspects, one or more data source 122a, 122b may be part of media management system 102 and/or part of the same system as media management system 102.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
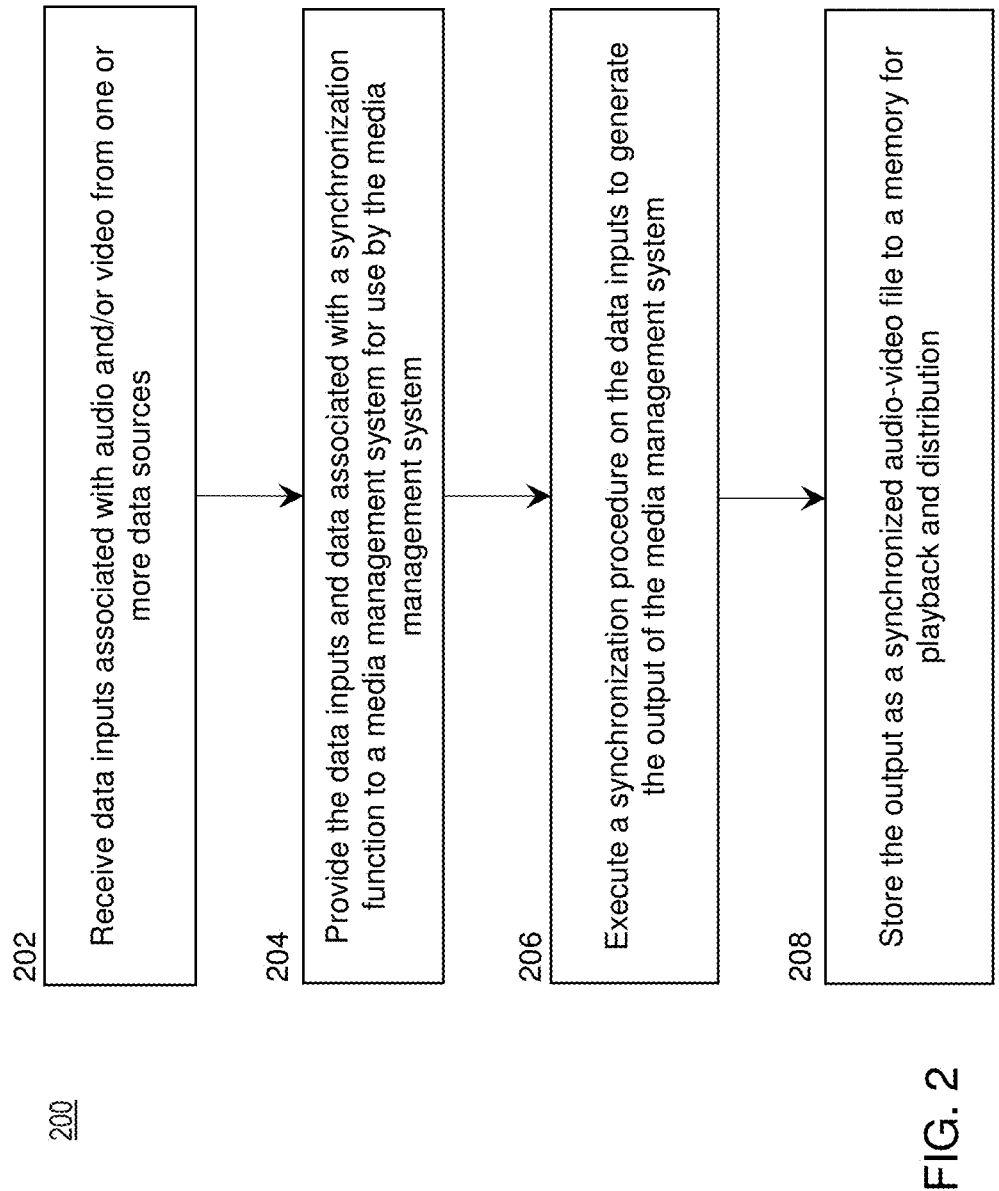
FIG. 2 is a flow diagram of a process for synchronizing a plurality of audio inputs with a video input includes, according to some non-limiting embodiments or aspects of the present disclosure.

Referring now to FIG. 2, FIG. 2 is a flow diagram of process 200 for synchronizing a plurality of audio inputs with a video input includes, according to some non-limiting embodiments or aspects of the present disclosure. The steps shown in FIG. 2 are for example purposes only. It will be appreciated that additional, fewer, different, and/or different order of steps may be used in non-limiting embodiments or aspects. In some non-limiting embodiments or aspects, a step may be automatically performed in response to performance and/or completion of a prior step. In some non-limiting embodiments or aspects, one or more of the steps of process 200 may be performed (e.g., completely, partially, and/or the like) by media management system 102 (e.g., at least one computing device of media management system 102). In some non-limiting embodiments or aspects, one or more of the steps of process 200 may be performed (e.g., completely, partially, and/or the like) by another system, another device, another group of systems, or another group of devices, separate from or including media management system 102, such as user device 112, one or more data source 122a, 122b, and/or the like.

As shown in FIG. 2, at step 202, process 200 may include receiving data inputs associated with audio and/or video, which may include a first data input, a second data input, a third data input, and optionally one or more additional data input, from one or more data source. For example, media management system 102 may receive the data inputs. In some non-limiting embodiments or aspects, media management system 102 may receive the data inputs from one or more data source 122a, 122b, and/or user device 112.

In some non-limiting embodiments or aspects, the first data input may include a video input (e.g., moving visual media) and the second data input may include a first audio input (e.g., audial media). In some non-limiting embodiments or aspects, the video input and the first audio input may be received from a data source (e.g., one or one or more data source 122a, 122b). In some non-limiting embodiments or aspects, the video input and the first audio input may be received from user device 112, such as an audio-video recording device (e.g., a smartphone, a camcorder, and the like).

In some non-limiting embodiments or aspects, the video input may be received in real-time relative to capture of the video input by the audio-video recording device (e.g., as soon as practically available after an event (e.g., after video capture)), and recorded as a video file, while video is recorded with a user device 112 or an external device associated with a user device. For example, media management system 102 may receive the video input from one or more data source 122a, 122b in real-time and record the video input as a video file (e.g., recorded moving visual electronic or computer readable media), while video (e.g., moving images) is recorded with a camera of user device 112 (e.g., an audio-video recording device) or an external camera associated with user device 112, such as a camera associated with one or more data source 122a, 122b.

In some non-limiting embodiments or aspects, the first audio input may be received in real-time relative to capture of the first audio input by the audio-video recording device, and recorded as an audio file, while audio is recorded with a user device 112 or an external device associated with a user device. For example, media management system 102 may receive the first audio input from one or more data source 122a, 122b in real-time and record the video input as a video file (e.g., recorded audial electronic or computer readable media), while audio (e.g., sound) is recorded (e.g., of the environment of the user device 112) with a microphone of user device 112 or an external microphone associated with user device 112, such as a microphone associated with one or more data source 122a, 122b.

In some non-limiting embodiments or aspects, the video input and the first audio input may be recorded together in real-time as an audio-video file, while audio and video are recorded with the user device 112 or an external device associated with the user device 112. For example, media management system 102 may record the video input and the first audio input together in real-time as an audio-video file (e.g., recorded audial and visual electronic or computer readable media), while audio and video are recorded with user device 112 or an external device associated with user device 112.

In some non-limiting embodiments or aspects, the third data input may be a second audio input associated with a pre-recorded audio file, and the second audio input may be received from a data source of the one or more data source via a communication network and recorded as part of the audio-video file in real-time, as the video input, the first audio input, and the second audio input are received. The second audio input may not be captured by the audio-video recording device. In some non-limiting embodiments, the second audio input may be audial media (e.g., music, speech, sound effects, and the like) in the form of signals associated with a song, a voice over, a sound effect, or the like, or a combination thereof. For example, media management system 102 may receive the second audio input, which may be associated with a song, from one or more data source 122a, 122b, storage within or associated with media management system 102, and/or user device 112 via communication network 104. Further, media management system 102 may integrate the second audio input as part of the audio-video file in real-time relative to capture of the audio/video input from the audio-video recording device, while media management system 102 receives the video input, the first audio input, and the second audio input.

In some non-limiting embodiments or aspects, the second audio input may be stored on the user device 112. In some non-limiting embodiments or aspects, the second audio input may be stored on a server separate from the user device 112 but accessible thereto (e.g., a server of an audio library accessible by user device 112).

In some non-limiting embodiments or aspects, the one or more additional data input may be a third audio input associated with a pre-recorded audio file, and the third audio input may be received from a data source of the one or more data source via a communication network, and recorded as part of the audio-video file in real-time, as the video input, the first audio input, the second audio input and the third audio input are received. In some non-limiting embodiments, the third audio input may be audial media in the form of signals associated with a song, a voice over, a sound effect, or the like, or a combination thereof. For example, media management system 102 may receive the third audio input, which may be associated with a sound effect, from one or more data source 122a, 122b, storage within or associated with media management system 102, and/or user device 112 via communication network 104. Further, media management system 102 may integrate the third audio input as part of the audio-video file in real-time, while media management system 102 receives the video input, the first audio input, the second audio input, and the third audio input.

In some non-limiting embodiments or aspects, the second audio input may be selected by the user prior to capture of the video input and the first audio input by the audio-video recording device. After selection of the second audio input, the user may operate the audio-video recording device to capture the video input and the first audio input by the audio-video recording device. Simultaneous with operating the audio-video recording device, the second audio input may be input to the media management system, and the synchronization procedure executed during the operating the audio-video recording device.

In some non-limiting embodiments or aspects, during operation of the audio-video recording device, a portion of the second audio input that will be synchronized with the video input and the first audio input in the audio-video file may be played in an earpiece worn by the user. This may enable the user to know what portion of the second audio input will be synchronized with what portion of the video input and the second audio input, to know the relative sound level of the audio inputs, the relative playback speed of the audio inputs, and the like. Based on and in response to this feedback to the user, the user may manipulate the synchronization as described hereinafter.

As shown in FIG. 2, at step 204, process 200 may include providing the data inputs, and data associated with a synchronization function to a media management system 102 for use by the media management system 102. In some non-limiting embodiments or aspects, the first data input, the second data input, the third data input, optionally one or more additional data input, and the data associated with a synchronization function regarding synchronization of the data inputs for use by the media management system 102 to generate an output may be provided to a media management system 102 as inputs to the media management system 102. For example, the video input, the first audio input, the second audio input, optionally the third audio input, and data associated with a synchronization function regarding synchronization of the data inputs may be provided to media management system 102 for use by media management system 102 (e.g., to create the audio-video file). In some non-limiting embodiments, data associated with a synchronization function with regard to synchronization of the data inputs may include software codes (e.g., codes automatically executed by media management system 102), configuration details of the one or more resources of media management system 102, user device 112, and/or one or more data source 122a, 122b, from which the video input, the first audio input, the second audio input, and the third audio input are input from and/or communicated to, and/or one or more instructions for manipulation of the inputs based on input type, size, duration and/or other aspects.

As shown in FIG. 2, at step 206, process 200 may include executing a synchronization procedure on the data inputs to generate the output of the media management system 102. In some non-limiting embodiments or aspects, media management system 102 may execute the synchronization procedure on the first data input, the second data input, the third data input, and optionally one or more additional data input to generate the output of the media management system 102, and the output of the synchronization procedure of the media management system 102 may include a synchronized audio-video file. For example, media management system 102 may execute a synchronization procedure on the video input, the first audio input, the second audio input, and/or any additional inputs to generate a combined and synchronized output file (e.g., synchronized audio-video file).

In some non-limiting embodiments or aspects, the synchronization procedure may include manipulating, during synchronization of the data inputs by the media management system 102 at least one aspect of the data inputs. In some non-limiting embodiments, the aspects manipulated during the synchronization procedure may include: a.) a relative volume level of the data inputs with respect to each other; b.) a relative play-back speed of the data inputs with respect to each other; c.) a timing interval associated with an event of any of the data inputs with respect to a timing interval associated with an event of any of the other data inputs; d.) another aspect, or any combination thereof. Further, the manipulation may be based on the data associated with the synchronization function regarding synchronization of the data inputs for use by the media management system 102, and at least one aspect of the manipulation may be manually executed by a user via a user interface of the user device.

In some non-limiting embodiments or aspects, media management system 102 may manipulate, during the synchronization procedure, a relative volume level of the first audio input with respect to a relative volume level of the second audio input, the optional third audio input, and any additional input. For example, the relative volume levels of each input may be manipulated proportionally with respect to each other input, such that for a given time interval, the volume level of the first audio input (e.g., sound from an environment) may be adjusted to 70% (i.e., 70% of the audio output aspect of the synchronized output), the volume level of the second audio input (e.g., voice over) may be adjusted to 20%, and the volume level of the third audio input (e.g., music) may be adjusted to 10%. Additionally or alternatively, the volume level of each input may be adjusted independently. For example, for a given time interval, the volume level of the first audio input may be adjusted to 100% (i.e., its original or recorded play-back speed), the volume level of the second audio input may be adjusted to 85% (i.e., 85% of its original or recorded play-back speed), and the volume level of the third audio input may be adjusted to 75%.

In some non-limiting embodiments or aspects, media management system 102 may further manipulate, during the synchronization procedure, a relative play-back speed of the data inputs with respect to each other. For example, the relative play-back speed of the video input may be adjusted to 3× (i.e., three times that of its original or recorded play-back speed), while the relative play-back speed of the first audio input may be set to 1×, the relative play-back speed of the second audio input may be set to 0.5×, and the relative play-back speed of the third audio input may be set to 2×.

In some non-limiting embodiments or aspects, media management system 102 may further manipulate, during the synchronization procedure, a timing interval associated with an event of any of the data inputs with respect to a timing interval associated with an event of any of the other data inputs. For example, the first audio input may be adjust to start or play upon the start or play of the video input, the second audio input may be adjusted to start upon occurrence a predefined action or event such as occurrence of a motion, gesture, or color profile aspect of the video input, and the third audio input may be adjust to start upon occurrence of a sound, frequency, another aspect, or a lack thereof of the second audio input.

In some non-limiting embodiments or aspects, the manipulation of the inputs and/or aspects thereof may be based on the data associated with the synchronization function regarding synchronization of the data inputs for use by the media management system. Further, at least one aspect of the manipulation may be manually executed by a user via a user interface of the user device. For example, volume control, play-back speed, and/or timing intervals may be manually adjusted by a user via a user interface such as a touch screen or buttons associated with user device 112, or by any other systems or devices associated with media management system 102. The user may manually execute the manipulation during synchronization. The user may manually execute the manipulation during capture of the video and audio inputs by the audio-video recording device.

As shown in FIG. 2, in some non-limiting embodiments or aspects at step 208, process 200 may include storing the synchronized audio-video file to a memory for play-back and distribution. For example, media management system 102 may store the audio-video file to storage or memory of media management system 102, user device 112, one or more data source 122a, 122b, and/or any combination thereof, and the audio-video file may be configured (e.g., formatted) to be distributed or sent (e.g., via communication network 104) to a device (e.g., a user device or server), to a network (e.g., the Internet), to a system (e.g., a software application or an online platform such as a social media platform), and/or to any combination thereof.

In some non-limiting embodiments or aspects, the functionalities described herein for synchronizing the plurality of audio inputs with the video input to generate the audio-video file may be accessed via a mobile and/or web application. For example, the user may open and/or log into a mobile and/or web application to generate the audio-video file. For example, the mobile and/or web application may include selectable options for: selecting the second audio input, initiating and/or terminating recording of the first audio input and first video input, initiating synchronization of the second audio input with the first audio/video inputs, manipulating the synchronization as described herein, generating the audio-video file without requiring editing, initiating playback of the generated audio-video file, and/or the like.

Figure 3:
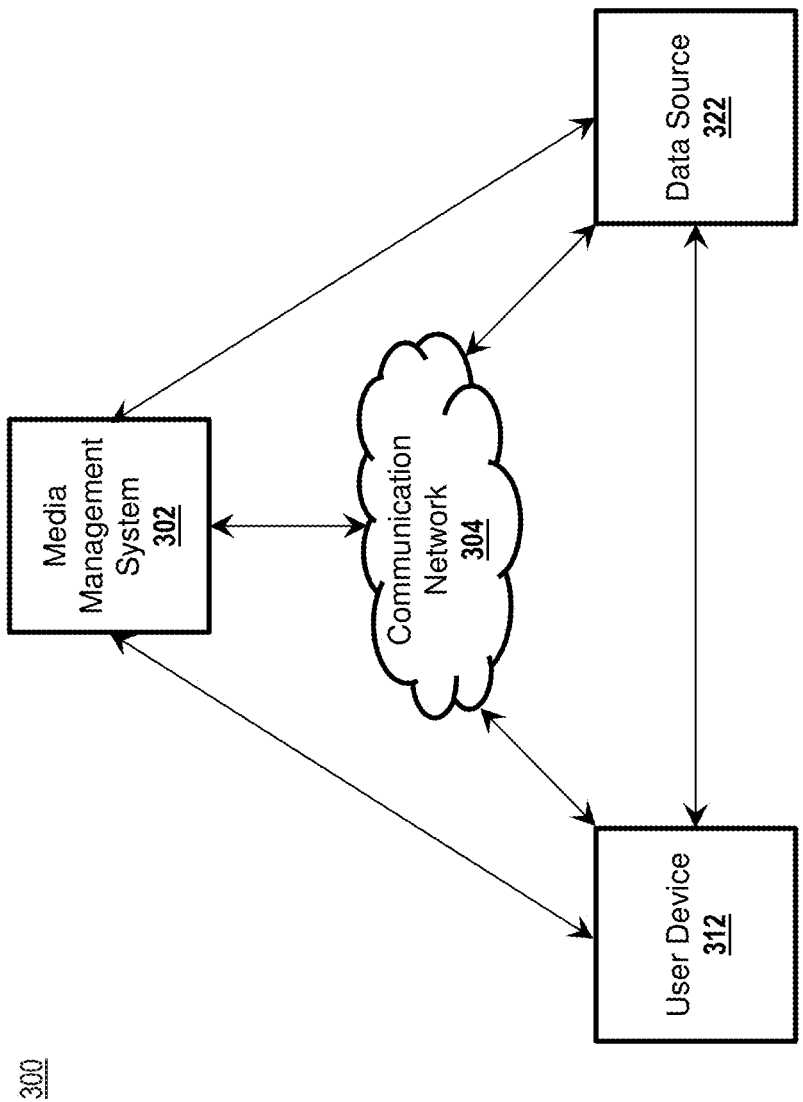
FIG. 3 is a diagram of an exemplary environment in which methods, systems, and/or computer program products, described herein, may be implemented, according to some non-limiting embodiments or aspects of the present disclosure.

Referring now to FIG. 3, shown is a diagram of exemplary environment 300 in which methods, systems, and/or computer program products, described herein, may be implemented, according to some non-limiting embodiments or aspects of the present disclosure. For example, as shown in FIG. 3, environment 300 may include media management system 302, communication network 304, user device 312, and/or data source 322. In some non-limiting embodiments or aspects, each of media management system 102, communication network 104, user device 112, and/or one or more data source 122a, 122b of FIG. 1 may be implemented by (e.g., part of) media management system 302.

Media management system 302 may include one or more devices capable of receiving information from and/or communicating information (e.g., directly via wired or wireless communication connection, indirectly via communication network 304, and/or the like) to user device 312, and/or data source 322. For example, media management system 302 may include a computing device, such as a server, a group of servers, a desktop computer, a portable computer, a mobile device, and/or other like devices. In some non-limiting embodiments or aspects, media management system 302 may be in communication with a data storage device (e.g., data source 322), which may be local or remote to media management system 302. In some non-limiting embodiments or aspects, media management system 302 may be capable of receiving information from, storing information in, communicating information to, or searching information stored in the data storage device (e.g., data source 322). In some non-limiting embodiments or aspects, media management system 302 may include a plurality of resources, such as a plurality of physical resources (e.g., bare metal servers) and/or a plurality of virtual resources (e.g., virtual machines that are run on hardware). In some non-limiting embodiments or aspects, media management system 302 may include a control device (e.g., a central controller, a primary server, a hypervisor, etc.) that operates to control the plurality of resources.

Communication network 304 may include one or more wired and/or wireless networks. For example, communication network 304 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

User device 312 may include one or more devices capable of receiving information from and/or communicating information (e.g., directly via wired or wireless communication connection, indirectly via communication network 304, and/or the like) to media management system 302, and/or data source 322. For example, user device 312 may include a computing device, such as a mobile device, a portable computer, a desktop computer, and/or other like devices. Additionally or alternatively, each user device 312 may include a device capable of receiving information from and/or communicating information to other user devices (e.g., directly via wired or wireless communication connection, indirectly via communication network 304, and/or the like). In some non-limiting embodiments or aspects, user device 312 may be part of media management system 102 and/or part of the same system as media management system 302. For example, media management system 302, data source 322, and user device 312 may all be (and/or be part of) a single system and/or a single computing device.

Data storage device 322 may include one or more devices capable of receiving information from and/or communicating information (e.g., directly via wired or wireless communication connection, indirectly via communication network 304, and/or the like) to media management system 302, user device 312, and/or another data source 322. For example, data source 322 may include a computing device, such as a server, a group of servers, a desktop computer, a portable computer, a mobile device, and/or other like devices. In some non-limiting embodiments, data source 322 may include one or more devices capable of recording, copying, inscribing and/or transcribing data. For example, data source 322 may include a digital camera, an analog camera, a digital microphone, an analog microphone, and/or other like devices. In some non-limiting embodiments or aspects, data source 322 may include a data storage device. In some non-limiting embodiments or aspects, data source 322 may be capable of receiving information from, storing information in, communicating information to, or searching information stored in the data storage device. In some non-limiting embodiments or aspects, data source 322 may be part of media management system 302 and/or part of the same system as media management system 302.

The number and arrangement of systems, devices, and/or networks shown in FIG. 3 are provided as an example. There may be additional systems, devices, and/or networks; fewer systems, devices, and/or networks; different systems, devices, and/or networks; and/or differently arranged systems, devices, and/or networks than those shown in FIG. 3. Furthermore, two or more systems or devices shown in FIG. 3 may be implemented within a single system or device, or a single system or device shown in FIG. 3 may be implemented as multiple, distributed systems or devices. Additionally or alternatively, a set of systems (e.g., one or more systems) or a set of devices (e.g., one or more devices) of environment 300 may perform one or more functions described as being performed by another set of systems or another set of devices of environment 300.

Figure 4:
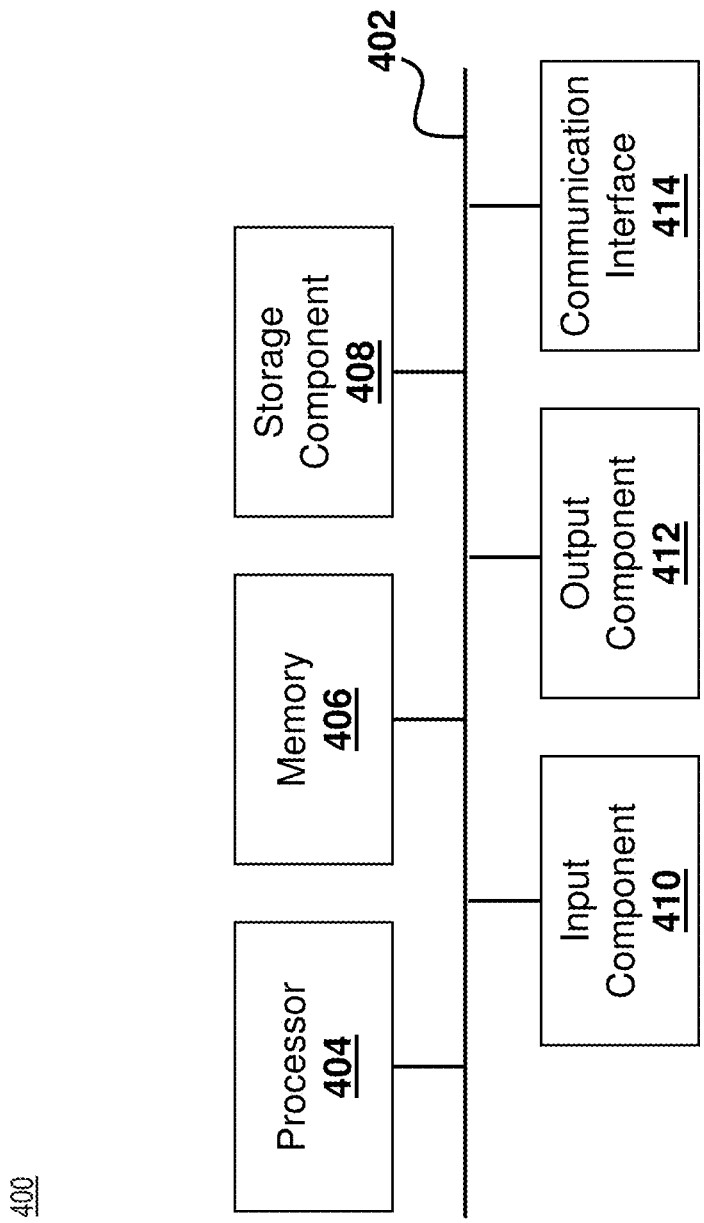
FIG. 4 is a schematic diagram of example components of one or more devices of FIG. 1 and/or FIG. 3, according to some non-limiting embodiments or aspects of the present disclosure.

Referring now to FIG. 4, shown is a diagram of example components of example device 400, according to some non-limiting embodiments or aspects of the present disclosure. Device 400 may correspond to at least one of media management system 102, user device 112, and/or one or more data source 122a, 122b in FIG. 1 and/or at least one of media management system 302, user device 312, and/or data source 322 in FIG. 3, as an example. In some non-limiting embodiments or aspects, such systems or devices in FIG. 1 or FIG. 3 may include at least one device 400 and/or at least one component of device 400. The number and arrangement of components shown in FIG. 4 are provided as an example. In some non-limiting embodiments or aspects, device 400 may include additional components, fewer components, different components, or differently arranged components than those shown in FIG. 4. Additionally or alternatively, a set of components (e.g., one or more components) of device 400 may perform one or more functions described as being performed by another set of components of device 400.

As shown in FIG. 4, device 400 may include bus 402, processor 404, memory 406, storage component 408, input component 410, output component 412, and communication interface 414. Bus 402 may include a component that permits communication among the components of device

400. In some non-limiting embodiments or aspects, processor 404 may be implemented in hardware, firmware, or a combination of hardware and software. For example, processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 406 may include random access memory (RAM), read only memory (ROM), and/or another type of dynamic or static storage device (e.g., flash memory, magnetic memory, optical memory, etc.) that stores information and/or instructions for use by processor 404.

With continued reference to FIG. 4, storage component 408 may store information and/or software related to the operation and use of device 400. For example, storage component 408 may include a hard disk (e.g., a magnetic disk, an optical disk, a magneto-optic disk, a solid-state disk, etc.) and/or another type of computer-readable medium. Input component 410 may include a component that permits device 400 to receive information, such as via user input (e.g., a touch screen display, a keyboard, a keypad, a mouse, a button, a switch, a microphone, etc.). Additionally or alternatively, input component 410 may include a sensor for sensing information (e.g., a global positioning system (GPS) component, an accelerometer, a gyroscope, an actuator, etc.). Output component 412 may include a component that provides output information from device 400 (e.g., a display, a speaker, one or more light-emitting diodes (LEDs), etc.). Communication interface 414 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium may include any non-transitory memory device. A memory device includes memory space located inside of a single physical storage device or memory space spread across multiple physical storage devices. Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

It is to be understood, that while the methods, systems, and computer program products have been described with respect to the synchronization of a plurality of audio inputs with a video input during recording of the video input and one or more of the audio inputs, it is also contemplated that the methods, systems and computer program product are applicable for, but not limited to, implementation with regard to synchronization of any number of audio inputs and/or any number of video inputs, and it is considered that any number of audio inputs and/or any number of video inputs may be recorded independently or together and stored as an audio file, a video file, an audio-video file, or any combination thereof.

EXAMPLE

The following example is presented to demonstrate the general principles of the disclosure. The disclosure should not be considered as limited to the specific examples presented.

A user may generate a synchronized audio-video file from a video component and a plurality of audio components. The video component and the first audio component may be video and audio captured by an audio-video recording device, and the second audio component may be a pre-recorded audio file.

In this non-limiting example, the audio-video file may comprise a home video created by a user using their smartphone. The home video may be of a child's birthday party.

The user may select the pre-recorded audio file they wish to synchronize with the audio-video file being created. For example, the user may select a pre-recorded version of the Happy Birthday song. The user may use their audio-video recording device (e.g., smart phone) to capture a scene at the birthday party, such as the child opening presents. The video input captured by the audio-video recording device may comprise the moving images of the scene, while the first audio input may capture the sounds of the scene. While the user captures the scene with the audio-video recording device, the Happy Birthday song may be automatically and simultaneously synchronized with the video input and audio input captured by the audio-video recording device to create an audio-video file. Thus, the Happy Birthday song may be automatically and simultaneously dubbed over the video input and audio input captured by the audio-video recording device simultaneous with the user using the audio-video recording device.

In response to the user completing capturing audio/video of the scene with the audio-video recording device (e.g., ending the recording), the system automatically generates the completed audio-video file containing the video component, the first audio component, and the second audio component synchronized. The audio-video file containing the synchronized video component and audio components may then be played back to the user. Both the sounds of the scene and the Happy Birthday song may be audible when played back. The audio-video file may have been generated without requiring video/audio editing from the user after capture of the video/audio input by the audio-video recording device. The audio-video file containing the synchronized video component and audio components may be synchronized during capture of the video component and the first audio component by the audio-video recording device.

While several examples of a for synchronizing a plurality of audio inputs with a video input during recording of the video input and one or more of the audio inputs are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

What is claimed is:

1. A method, comprising:
providing, to a media management system, data associated with a synchronization function regarding synchronization of video and audio inputs by the media management system to generate an audio-video file combining the video and audio inputs;
selecting a second audio input prior to capture of a video input and a first audio input by an audio-video recording device, wherein the first audio input corresponds to the video input such that the first audio input is an audial component of the video input, wherein the video input and the first audio input are captured by the audio-video recording device, wherein the second audio input comprises a pre-recorded audio file, wherein the second audio input is included as part of the audio-video file in real-time as the video input and the first audio input are captured, wherein the pre-recorded audio file is not captured by the audio-video recording device;
operating, by a user, the audio-video recording device to capture the video input with a camera of the audio-video recording device and to capture the first audio input with a microphone of the audio-video recording device and inputting the video input and the first audio input to the media management system;
during operation of the audio-video recording device, playing at least a portion of the second audio input that will be synchronized with the video input and the first audio input in the audio-video file by the media management system in an earpiece worn by the user;
during operation of the audio-video recording device, while the second audio input is playing in the earpiece worn by the user, and during synchronization of the second audio input with the video input and the first audio input, manipulating, by the user, at least one of the following: a relative volume level, a relative play-back speed, a timing interval, or any combination thereof of the second audio input relative to the video input and/or the first audio input;
during operation of the audio-video recording device and manipulation of the second audio input by the user, automatically synchronizing, by the media management system, the video input, the first audio input, and the manipulated second audio input based on the data associated with the synchronization function, the video input and the first audio file captured by the audio-video recording device, and the user manipulation of the second audio input during operation of the audio-video recording device to generate the audio-video file, the audio-video file generated in real-time relative to capture of the video input and the first audio input by the audio-video recording device, the audio-video file generated without the user performing an editing process after capture of the video input and the first audio input by the audio-video recording device.

2. The method of claim 1, wherein the video input is received in real-time and recorded as a video file, relative to capture of the video input by the audio-video recording device,
wherein the first audio input is received in real-time and recorded as an audio file, relative to capture of the first audio input by the audio-video recording device, and
wherein the video input and the first audio input are recorded together in real-time as an audio-video file, as audio and video are captured by the audio-video recording device.

3. The method of claim 1, further comprising:
storing the audio-video file to a memory for play-back and distribution.

4. A system, comprising a media management system configured to:
receive data associated with a synchronization function regarding synchronization of video and audio inputs by the media management system to generate an audio-video file combining the video and audio inputs;
receive a video input and a first audio input in response to the user operating an audio-video recording device to capture the video input with a camera of the audio-video recording device and to capture the first audio input with a microphone of the audio-video recording device, wherein the first audio input corresponds to the video input such that the first audio input is an audial component of the video input, wherein a second audio input comprises a pre-recorded audio file, wherein the second audio input is included as part of the audio-video file in real-time as the video input and the first audio input are captured, wherein the pre-recorded audio file is not captured by the audio-video recording device;
receive the second audio input selected by a user prior to capture of a video input and a first audio input by an audio-video recording device, the second audio file manipulated by the user during operation of the audio-video recording device, while the second audio input is playing in an earpiece worn by the user and during synchronization of the second audio input with the video input and the first audio input, the second audio file manipulated by the user manipulating at least one of the following: a relative volume level, a relative play-back speed, a timing interval, or any combination thereof of the second audio input relative to the video input and/or the first audio input;
during operation of the audio-video recording device and manipulation of the second audio input by the user, automatically synchronize the video input, the first audio input, and the manipulated second audio input based on the data associated with the synchronization function, the video input and the first audio file captured by the audio-video recording device, and the user manipulation of the second audio input during operation of the audio-video recording device to generate the audio-video file, the audio-video file generated in real-time relative to capture of the video input and the first audio input by the audio-video recording device, the audio-video file generated without the user performing an editing process after capture of the video input and the first audio input by the audio-video recording device.

5. The system of claim 4, wherein the at least one processor is further configured to:

receive the video input in real-time and record the video input as a video file, relative to capture of the video input by the audio-video recording device, receive the first audio input in real-time and record the first audio input as an audio file, relative to capture of the first audio input by the audio-video recording device, wherein the video input and the first audio input are recorded together in real-time as an audio-video file, as audio and video are captured by the audio-video recording device.

6. The system of claim 4, wherein the at least one processor is further configured to store the audio-video file to a memory for play-back and distribution.

7. A computer program product, comprising at least one non-transitory computer-readable medium including one or more program instructions that, when executed by at least one processor of a media management system, cause the at least one processor to:

receive data associated with a synchronization function regarding synchronization of video and audio inputs by the media management system to generate an audio-video file combining the video and audio inputs;

receive a video input and a first audio input in response to the user operating an audio-video recording device to capture the video input with a camera of the audio-video recording device and the first audio input with a microphone of the audio-video recording device, wherein the first audio input corresponds to the video input such that the first audio input is an audial component of the video input, wherein a second audio input comprises a pre-recorded audio file, wherein the second audio input is included as part of the audio-video file in real-time as the video input and the first audio input are captured, wherein the pre-recorded audio file is not captured by the audio-video recording device;

receive the second audio input selected by a user prior to capture of a video input and a first audio input by an audio-video recording device, the second audio file manipulated by the user during operation of the audio-video recording device, while the second audio input is playing in an earpiece worn by the user and during synchronization of the second audio input with the video input and the first audio input, the second audio file manipulated by the user manipulating at least one of the following: a relative volume level, a relative play-back speed, a timing interval, or any combination thereof of the second audio input relative to the video input and/or the first audio input;

during operation of the audio-video recording device and manipulation of the second audio input by the user, automatically synchronize the video input, the first audio input, and the manipulated second audio input based on the data associated with the synchronization function, the video input and the first audio file captured by the audio-video recording device, and the user manipulation of the second audio input during operation of the audio-video recording device, to generate the audio-video file the audio-video file generated in real-time relative to capture of the video input and the first audio input by the audio-video recording device, the audio-video file generated without the user performing an editing process after capture of the video input and the first audio input by the audio-video recording device.

\* \* \* \* \*